United States Patent
Wandersleben et al.

(10) Patent No.: US 6,853,390 B1
(45) Date of Patent: Feb. 8, 2005

(54) DISPLAYING OPTION INFORMATION USING A NON-MODAL DIALOG BOX

(75) Inventors: William A. Wandersleben, Glenmoore, PA (US); R. Brien Bastings, Glenmoore, PA (US); Gino Cortesi, Honey Brook, PA (US)

(73) Assignee: Bentley Systems, Inc., Exton, PA (US)

( * ) Notice: Subject to any disclaimer, the term of this patent is extended or adjusted under 35 U.S.C. 154(b) by 443 days.

(21) Appl. No.: 09/696,882

(22) Filed: Oct. 26, 2000

(51) Int. Cl.$^7$ ................................................ G06F 5/00
(52) U.S. Cl. ....................... 345/802; 345/835; 345/842; 345/843
(58) Field of Search .......................... 345/802, 808–812, 345/822, 825, 835, 837, 860, 841–846, 866, 902

(56) References Cited

U.S. PATENT DOCUMENTS

| | | | |
|---|---|---|---|
| 5,546,528 A | * 8/1996 | Johnston | 345/807 |
| 5,675,752 A | * 10/1997 | Scott et al. | 345/866 |
| 5,784,068 A | 7/1998 | Brown | |
| 5,812,132 A | * 9/1998 | Goldstein | 345/797 |
| 5,912,666 A | * 6/1999 | Watson et al. | 345/856 |
| 5,999,173 A | * 12/1999 | Ubillos | 345/724 |
| 6,005,550 A | 12/1999 | Vaughan et al. | |
| 6,023,275 A | 2/2000 | Horvitz et al. | |
| 6,025,841 A | 2/2000 | Finkelstein et al. | |
| 6,058,368 A | * 5/2000 | Aourane | 705/7 |
| 6,144,765 A | * 11/2000 | Tamura et al. | 382/197 |
| 6,157,934 A | * 12/2000 | Khan et al. | 715/503 |
| 6,232,968 B1 | * 5/2001 | Alimpich et al. | 345/744 |
| 6,266,060 B1 | * 7/2001 | Roth | 345/853 |
| 6,313,824 B1 | * 11/2001 | Meisner et al. | 345/589 |
| 6,340,979 B1 | * 1/2002 | Beaton et al. | 345/764 |
| 6,384,849 B1 | * 5/2002 | Morcos et al. | 345/810 |

OTHER PUBLICATIONS

Screen Dumps of Microsoft Word 2000 (pp. 1–5, 1999).*
Screen Dumps of MicrosoftExcel 2000 (pp. 1–5, 1999).*

* cited by examiner

*Primary Examiner*—Kristine Kincaid
*Assistant Examiner*—Le Nguyen
(74) *Attorney, Agent, or Firm*—Winston & Strawn LLP (57) ABSTRACT

The invention pertains to a method for displaying option information on a computer display screen. The method includes displaying a workspace and at least one icon, presenting a non-modal dialog box when a predetermined icon is chosen, providing a preference option that may hide or shrink the non-modal dialog box, and providing a means for restoring the non-modal dialog box. The dialog box may subsequently be restored in a manner and a location chosen by the user.

12 Claims, 11 Drawing Sheets

DISPLAYING OPTION INFORMATION USING A NON-MODAL DIALOG BOX

TECHNICAL FIELD

This invention relates to a method for displaying computer software option information on a computer display screen. In particular, the invention may be applied to software such as computer-aided design (CAD) software, to maximize the computer screen real estate while providing a user a full range of options to conduct certain operations.

BACKGROUND

A computer user or operator typically employs a computer system having an installed computer-aided drafting software system ("drafting system"), to draw an object on a computer monitor or display screen. The drafting system employs a cursor on the computer monitor screen to depict a current position on a drawing field, and the operator uses a cursor manipulator such as a computer mouse, joystick, puck, roller ball device or the like, to manipulate the cursor on the computer display and drawing field. The user thus utilizes such an input device to transform a relative coordinate field (i.e., a digitizing surface or mouse pad) to an absolute coordinate field (the design, in whole or in part that is displayed on the screen). For example, a three dimensional design may be represented even though the digitizing surface is two-dimensional.

Modern computer drafting systems typically provide a user interface consisting of various items, including collections of icons that facilitate the drawing, modification, and manipulation of elements that represent real world information. Such drafting systems typically include tool settings that not only contribute to data input, but aid in manipulating and modifying design data that originated from various sources. Accordingly, the user selectively chooses icons and tool settings to interconnect multiple numbers of dimensioned drawing elements to form a shaped object. For example, a computer user may construct a box-like object from a number of line elements, each line element having a selected length and position and being interconnected to at least one other line element.

The drawing field may extend beyond the confines of the computer display screen such that only a portion of the drawing field is displayed. The drawing field may be defined according to a universal coordinate system, such as a rectangular or polar coordinate system, where the drawing field has a single origin and each point in the drawing field has a unique coordinate. Accordingly, a computer user can position each element in the drawing field according to the universal coordinate system.

When a drawing element or tool is chosen, a modal or non-modal dialog box containing tool settings and other options usually appears on the drawing field. Modal dialog boxes require all user interactions to be focused within the dialog box, and usually include an OK button and/or a Cancel button. Modal dialog boxes are used when an application, utility, tool, command or other means requires information before the application can continue, such as a file name, or when a complete set of information is required before proceeding, or when a message such as an alert or warning is given. Modal dialog boxes must be dismissed or closed before the user can proceed with further actions. Conversely, non-modal dialog boxes permit a user to interact with other dialog boxes or other parts of an application, such as with drawing tools. The controls in non-modal dialog boxes can be adjusted at any time, and non-modal dialog boxes do not have to be closed or dismissed before continuing work. It has been noted that non-modal dialog boxes improve design productivity because the user spends more time working on a computer drawing in comparison to users of design software that include modal dialog boxes, because modal dialog boxes require time and effort to open and close before proceeding with work.

However, any type of dialog box may sometimes impinge upon display screen real estate space, and must either be minimized, dismissed or otherwise moved in order to work on a sketch or other work-in-progress appearing on that part of the computer display screen. Thus, there is a need for providing a method to temporarily hide or shrink non-modal dialog boxes so that a computer operator is free to use a maximum amount of workspace, in order to further improve productivity.

SUMMARY

Presented is a method for displaying option information that operates to temporarily hide or shrink a non-modal display box. The method includes displaying a workspace on a computer screen, displaying at least one icon, presenting a non-modal dialog box within the workspace when a predetermined icon is chosen, providing a preference option that hides or shrinks the non-modal dialog box when a cursor moves off the frame of the dialog box, and providing at least one means for restoring the non-modal dialog box. The modal display dialog box may be subsequently restored in a location chosen by the user. The invention may contain one or more of the following features. The means for restoring may include at least one hot-spot on the screen. A hot-spot may include at least one of the icon and a preference option box, and at least one hot-spot may be re-located by a user to anywhere on the workspace. The means for restoring may include a key combination on a keyboard, and the cursor may be centered on the restored dialog box. Repeating the key combination may hide the dialog box. The method may further include providing a means to activate and to deactivate the preference option, and may further include providing a means for customizing the preference option. The means for customizing may be a preference option properties dialog that includes at least one customizable feature choice, and the customizable feature may include at least one of a choice between a large and a small preference option icon, an automatic positioning option for tool settings dialog boxes, a new tool delay time, and a hide dialog delay time.

Another aspect of the invention concerns a computer program residing on a computer-readable medium. The program includes instructions for causing a computer to display a workspace on a computer screen, the workspace having at least one toolbar including a plurality of icons that each represent a tool; display a non-modal dialog box when an icon is chosen; hide or shrink the non-modal dialog box when a preferences option is enabled and a cursor is moved outside the boundaries of the non-modal dialog box; and restore the non-modal dialog box when a restore action occurs.

The program may include one or more of the following features. The program may include instructions to permit a user to disable and enable the preference option. The restore action may include moving the cursor over a predetermined hot-spot on the workspace, and the hot-spot may include at least one of a tool icon and a preference option icon. At least one hot-spot may be moveable to a location anywhere on the workspace. The restore action may be entry of a key combination, the cursor may be centered on the restored dialog box, and repeating the key combination may hide or shrink the dialog box. The program may further include instructions enabling a user to customize the preference option, and a preference option properties dialog box that includes at least one customizable feature may be provided. The customizable features may include at least one of a choice of a large or small preference option box, a choice of automatically positioning a tool settings dialog, a new tool delay time, and a hide dialog delay time.

The present invention affords a user a technique for maximizing the amount of computer screen real-estate space usable for displaying work while also preserving a full range of options for conducting operations. Further, the capability of temporarily hiding or shrinking the non-modal dialog box also minimizes the need for a user to utilize the mouse or other cursor manipulator device. This reduction in the use of the mouse is beneficial because it minimizes repetitive movements which may put stress on a users wrist, and permits more time to be devoted to actually working on the project rather than to calling up, moving and/or dismissing dialog boxes.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
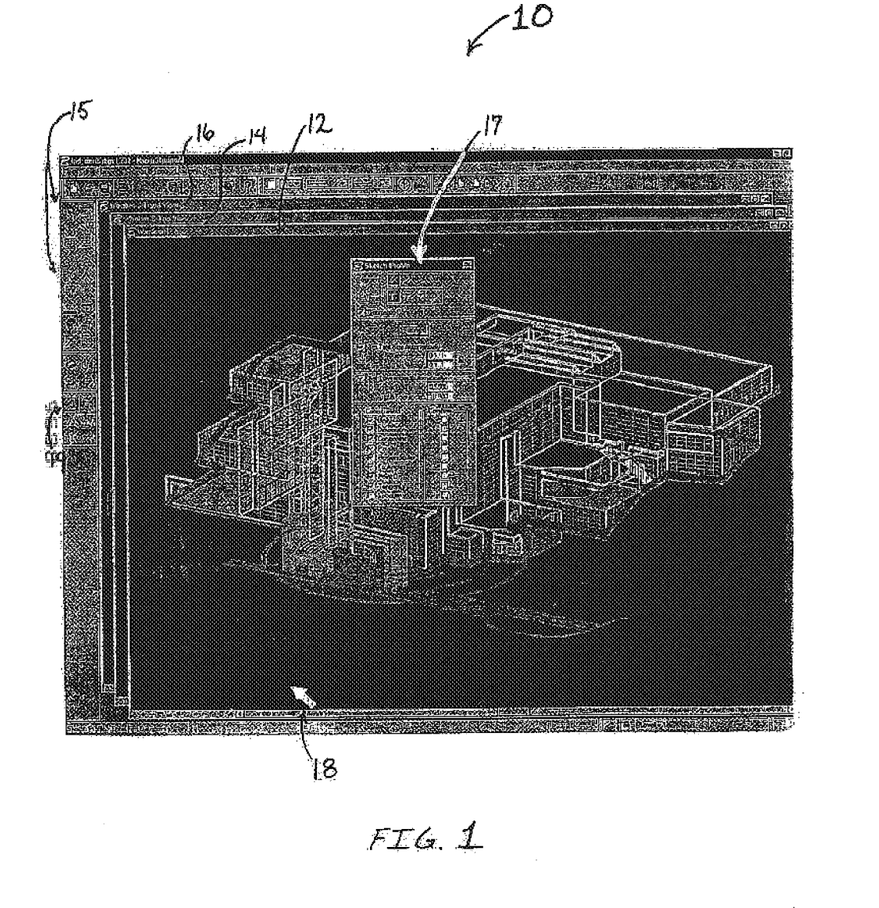
FIG. 1 is a snapshot view of a computer display screen displaying a drawing in progress.

FIG. 1 is a snapshot view of a computer display screen 10 displaying a partially finished perspective view 12 in window 1, a top view 14 (in window 2 behind window 1), and a front view 16 (in window 3 behind window 2) of a building of a drawing in progress of a building using a computer-aided design (CAD) program. The top view 14 and front view 16 are not shown in the drawings but can be easily accessed by a user in a known manner. Although the present invention will be discussed herein in the context of a CAD software program in a windowing environment, it should be understood that the method may be used with various other types of application software.

Referring again to the example shown in FIG. 1, a plurality of drawing tools 15 represented by icons may be arranged in "tool frames" that may be "docked" to reside on the left or the right side of the application window, mutually exclusive of the active viewing area, or may be moved to reside on other portions of the screen within the active viewing area. The tool frames may share and often obscure the same absolute coordinate area as the designs within the viewing area. "Tool boxes" can be "torn" from the tool frame and reside in similar areas of the screen (with the additional capability of being able to be docked to reside on the top or bottom sides of the application window). A non-modal "Sketch Profile" dialog box 17 is displayed on the screen because the sketch icon 19 has been chosen, and it contains various tool settings choices that may be set by the draftsperson. Such a tool settings dialog box 17 is a fundamental capability of the CAD software, and provides a way for users to change specific tool or active settings for various tools while the tool is active. The tool settings are context sensitive, which means that a particular type of non-modal dialog box will be displayed or "pop-up" on the screen depending on the tool being used. A cursor 18 (typically controlled by the computer mouse, a digital puck device, a roller-ball or other peripheral) is shown on another location on the screen.

As a computer user chooses a plurality of tools and opens more and more of these types of graphical user interface items during the design session, the active viewing area for design input, modification, and analysis may become more and more limited. In FIG. 1, for example, if the user wishes to view or work on the perspective view sketch 12 in the area on the screen that is under the dialog box 17, then the user must either dismiss (close) or move the dialog box. To close the dialog box, the cursor 18 is moved over the "X" in the upper right portion of the dialog box and then the left mouse button is clicked, or the dialog box may be moved by using the cursor to drag it to another location on the screen away from the area that the computer user wishes to work on.

Figure 2A:
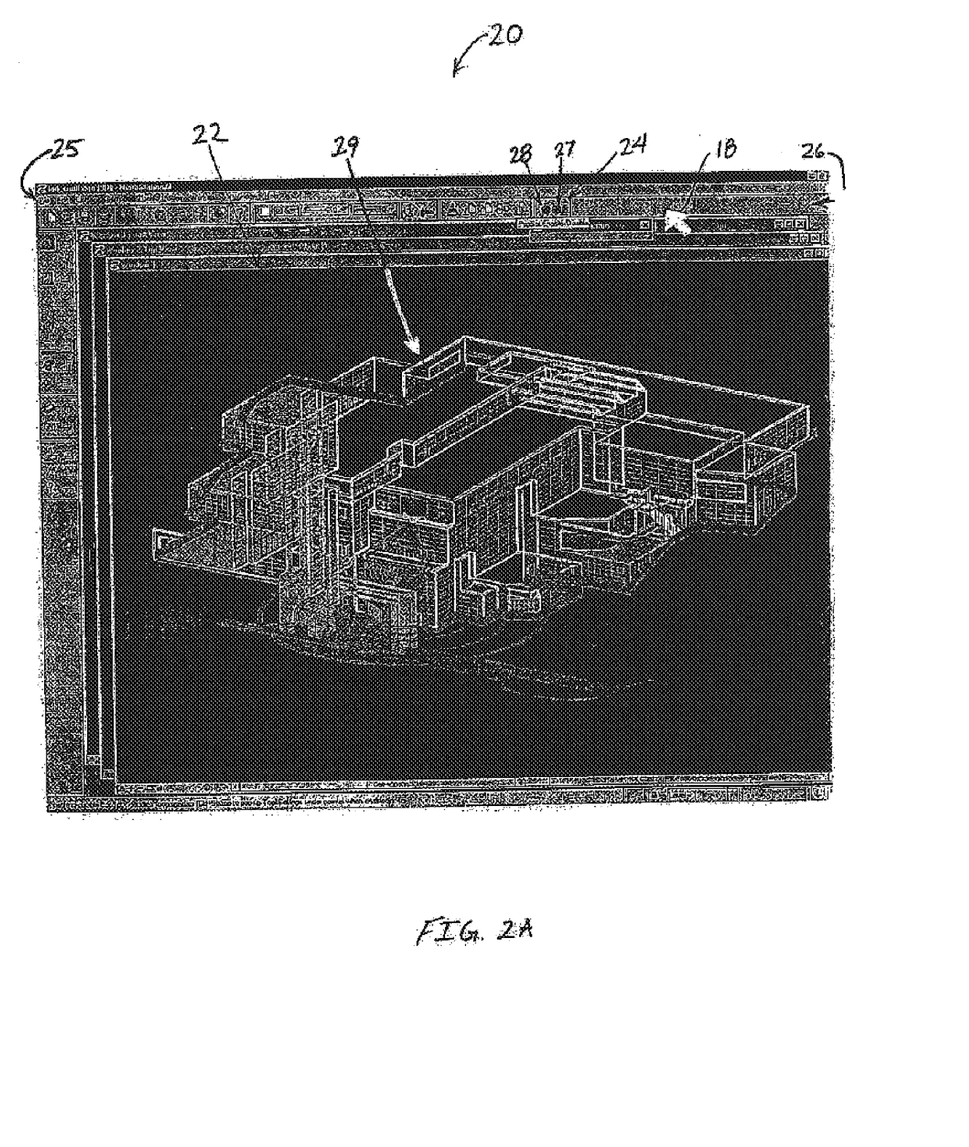
FIGS. 2A to 2C are snapshot views of a computer screen showing a drawing in progress and to illustrate an example of the PopSet™ option according to the invention.

FIG. 2A is a snapshot view of a computer screen 20 displaying a partially finished perspective view 22 drawing of a building using a computer-aided design (CAD) program equipped with a "PopSet™" option box 24. The PopSet™ application is an example of a software program that can be implemented to automatically position the tool settings display next to a selected tool icon and then hide the tool settings dialog as soon as the cursor is moved away from the tool settings window and over a view window. It should be understood that the PopSet™ application is only one example of the many possible sotfware programs that could be implemented according to the present invention. In addition, it should be understood that the program could operate to shrink the size of a dialog box instead of sinking or hiding it from view. In the illustrated implementation, the PopSet™ application has been installed and is docked above the window views, underneath a menu bar 25 on toolbar 26. In general, activation of the PopSet™ option permits one or more dialog boxes to be running but hidden during a computer session while design data is being added, removed or modified on the display screen. In the illustrated implementation, a computer user enables the PopSet™ option by positioning the cursor 18 and clicking on the green light button 27 in the option box 24 so that a bright green light will be displayed. To disable the PopSet™ option, the red light button 28 is chosen by positioning the cursor on it and clicking, so that a bright red light is displayed while the green light is muted. This is the PopSet™ "inactive" mode and returns the operation of the dialog boxes to that of regular non-modal dialog boxes (which is the same operation that occurs when the PopSet™ option is not loaded). When active (i.e. the code is loaded and the bright green light is displayed), operation is enhanced so that the PopSet™ option operates to hide or sink the tool settings dialog box when the cursor moves outside the frame area after that dialog box first appeared. Thus, the Sketch Profile dialog box is not visible in FIG. 2A because the PopSet™ option is active and the cursor 18 has been moved away from the area 29 where that dialog box was initially opened. Thus, more screen "real estate" is available to the computer user without removing or limiting fundamental functionality, and without requiring the user to take action such as moving open dialog boxes about the screen or dismissing them.

Figure 2B:
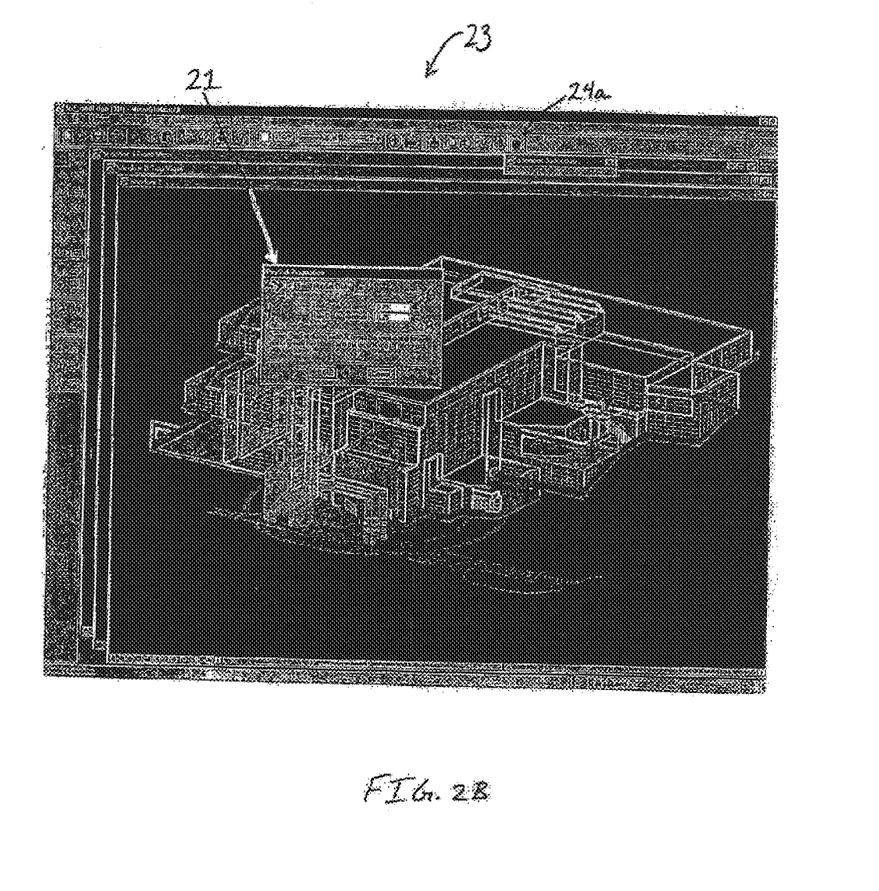
Figure 2C:
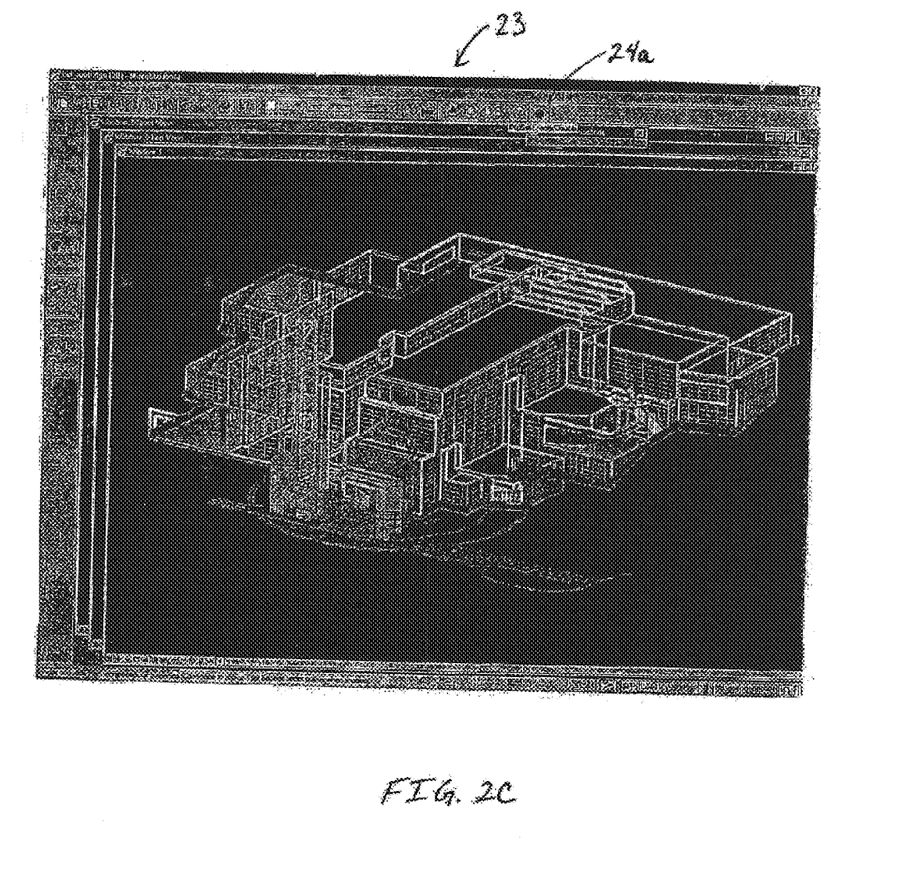

FIG. 2B illustrates a PopSet™ properties dialog box 21 on a display screen 23 which is activated, for example, when the cursor 18 is placed over the PopSet™ tool icon 24 of FIG. 2A and the user clicks the right button on her computer mouse (or respective other comparable action on another input device). The PopSet™ option properties can then be customized as follows. A small PopSet™ tool icon 24a can be chosen by checking that option 2, as shown. As a result, a single button PopSet™ tool icon 24a is displayed instead of the tool icon 24 having two buttons 27 and 28 shown in FIG. 2A. The small PopSet™ icon implementation minimizes the occupied screen space, and may be chosen if a user intends to have it dock with tool boxes. The larger icon 24 may be chosen if a user wishes it to dock with tool frames. In addition, if the box 4 is checked then the PopSet™ tool will automatically position the tool settings non-modal dialog box, such as the Sketch profile dialog box 17 of FIG. 1, when the cursor 18 is over a selected icon. If this option is disabled, then the tool settings dialog box can only be shown when the user performs a predetermined simultaneous key combination such as Ctrl+Space, or by moving the cursor over the PopSet™ icon 24a. A user may also specify a time period 6 (in seconds or fractions of a second) for display of the tool settings of a newly selected tool, after which delay the PopSet™ option will hide the tool settings dialog box. As shown in this example, a three-quarters of a second delay has been chosen. Similarly, the user may specify a time period 8 after which the PopSet™ option hides the tool settings dialog box after the cursor has been moved away and is over a view for that time period, which in this example has been set at one-quarter of a second. When the delay settings 6 and 8 are defined, the When the delay settings 6 and 8 are defined, the PopSet™ icon light may turn from a green color to yellow to signify that the grace period is running during which the PopSet™ option waits in case a user re-positions the cursor back onto the tool settings dialog box before hiding the dialog box. FIG. 2C illustrates the display screen 23 after the PopSet™ properties dialog box 21 of FIG. 2B has been dismissed, and a small PopSet tool icon 24a has been chosen.

Figure 3:
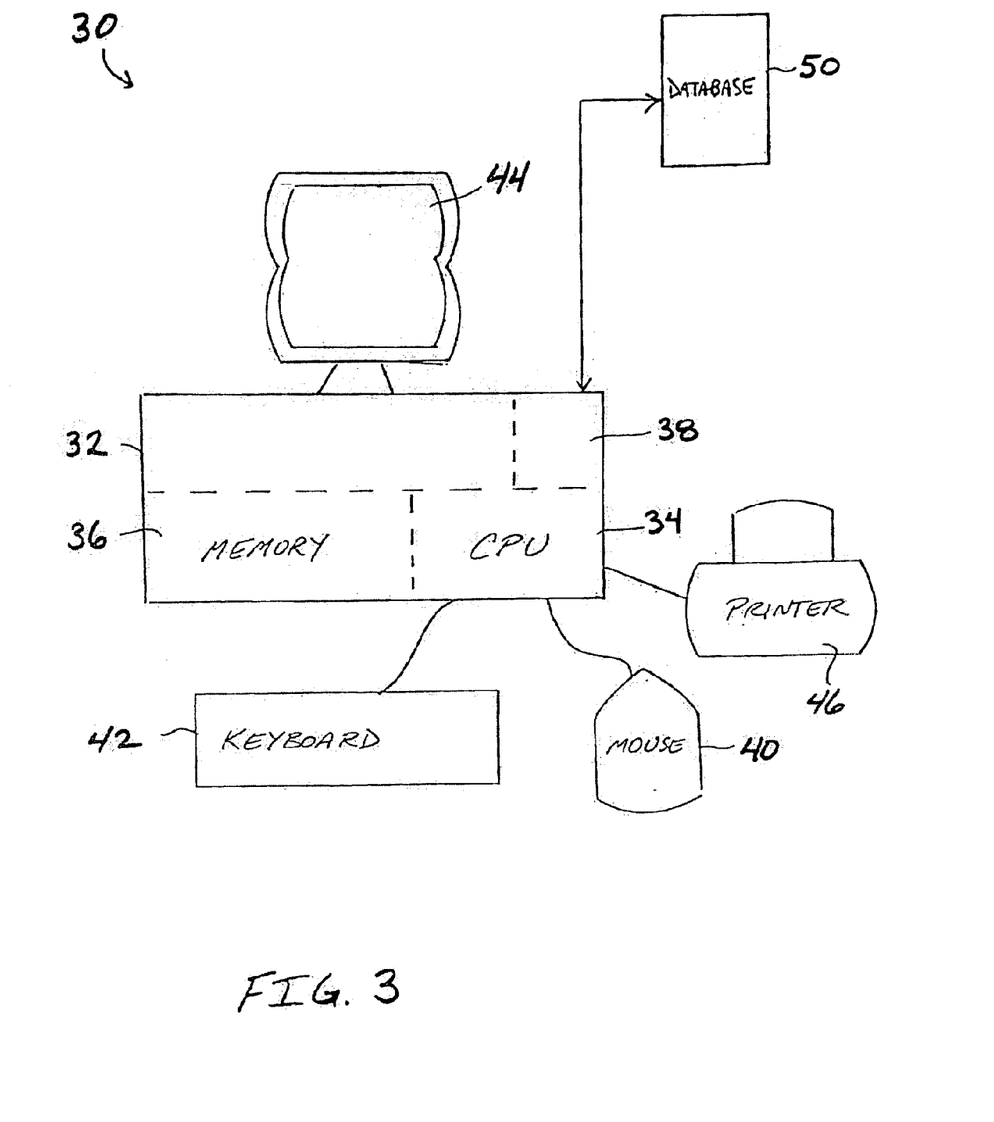
FIG. 3 is a simplified block diagram of a computer system of the type capable of implementing the invention.

FIG. 3 is a simplified block diagram of a computer system 30 which a user may utilize to implement the present technique. The computer system 30 includes a personal computer capable of running a software program to implement the techniques discussed herein. The personal computer may be any machine that contains hardware and an operating system that meets the minimum system configuration required to utilize the described techniques, may be small in size and portable, and may include connectivity hardware and software so that connections to a database 50 can be achieved from multiple locations.

The personal computer includes a housing 32 containing a central processing unit (CPU) 34, and a memory 36 associated with CPU that may contain pre-loaded software. The CPU 34 may be any conventional general-purpose single or multi-chip microprocessor. In addition, the CPU 34 may be any conventional special purpose microprocessor such as a digital signal processor or graphics processor, and may include connections to conventional address, data and control lines. The memory 36 may be a random access (RAM) and/or read-only (ROM) memory, and may contain software such as operating system software to provide functionality, such as the ability to print out information, and to execute software application programs. The housing 32 may also contain a communications device 38 which may be a modem, cable modem, wireless transceiver and/or other apparatus capable of sending and receiving digital or analog data. The communications device 38 is connected to the CPU 34 and is operable to establish two-way communications with the database 50. The database 50 may provide information to the computer for processing. The computer may be powerful enough to process the data from the database in real time and present data to a user. The database that the program operates on can reside on a computer's local hard disk, or a Local Area Network (LAN) server that is accessible from the computer running the software, or the software may be on the server.

Referring again to FIG. 3, input devices such as a mouse 40 and a keyboard 42 are also connected to the CPU 34 via connectors. A display 44 is connected to the CPU 34 and may be a conventional CRT display, a flat-panel display, a touch-screen display or other display capable of providing information in color to a user. A printer 46 may be connected to the CPU 34 via a connector and be operable to print out data, and/or other output devices such as plotters could be connected to the CPU.

Figure 4:
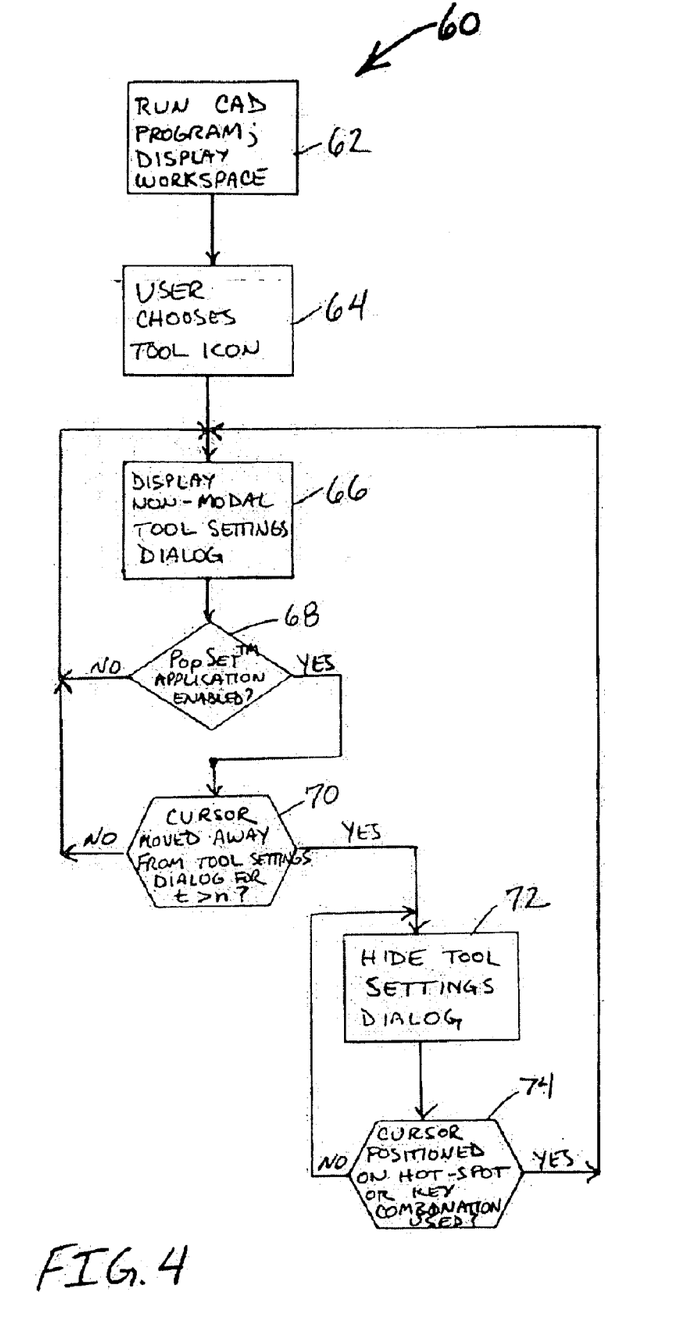
FIG. 4 is a simplified flowchart of an implementation of a method according to the invention.

FIG. 4 is a simplified flowchart 60 of a technique for hiding or sinking a dialog box to enable a user to work on a portion of the display screen that otherwise would be blocked by one or more dialog boxes. The flowchart 60 pertains to the PopSet™ application example described above, but it should be understood that the technique could be generalized for use with other types of software to maximize the amount of computer screen real estate used to conduct work while maintaining a full range of options for a user. In order to begin work, the user loads and runs 62 CAD software on her computer and a workspace including various options, including tool icons, is presented. A user begins work by choosing 64 a tool icon, then a non-modal tool settings dialog is displayed 66. If the PopSet™ application has been loaded and is enabled 68, then the application checks 70 to see if the cursor has been moved off the tool settings window for a time "t" greater than "n", where n may be a time in seconds or fractions of a second chosen by the user as explained above. If that occurs, then the tool settings dialog box is hidden 72 from the workspace although its functionality is preserved. The PopSet™ application then continually checks to see if the cursor has been moved over one or more predetermined hot-spots, or if a predetermined key combination has been used. If so, the non-modal tool settings dialog is again displayed 66; if not, then it remains hidden from the view of the user. Examples of various hot-spot locations are discussed below with reference to FIGS. 5A–5D.

If the PopSet™ application is not enabled 68, or if the PopSet™ application has been enabled and the cursor has not been moved off the tool settings dialog for a time greater than n, then the tool settings dialog remains displayed on the screen. Of course, when the PopSet™ application has been disabled then the CAD program operates in a conventional manner when a tool icon is chosen, to display the tool settings dialog typically in the center of the workspace area until the user specifically uses the cursor to move it or close it.

Figure 5A:
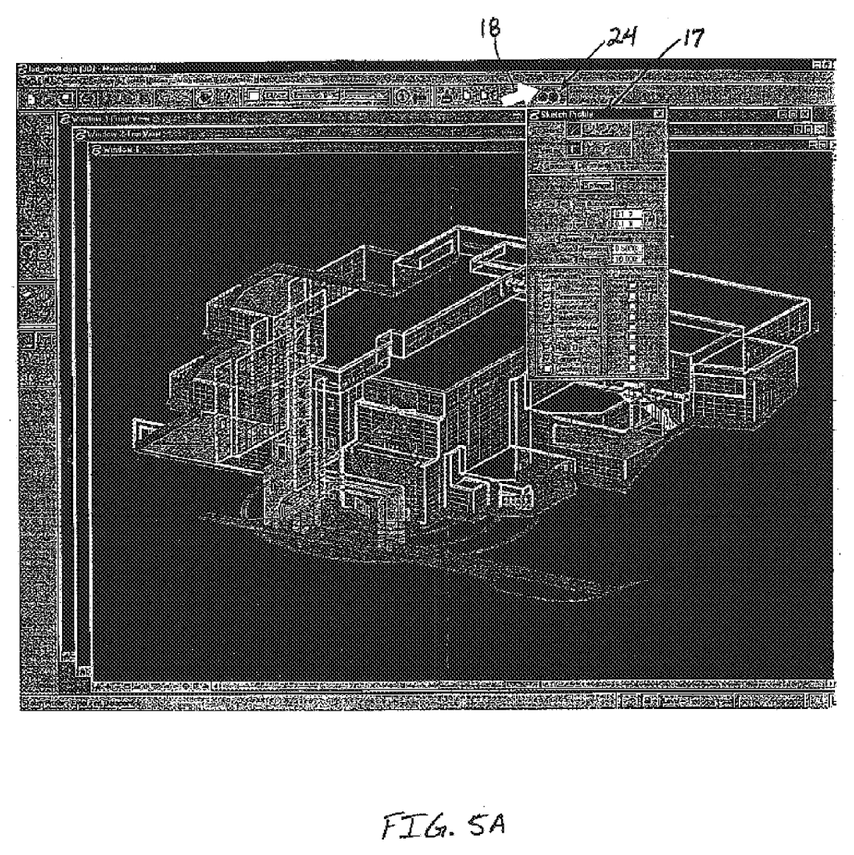
FIGS. 5A to 5D are snapshot views of a computer screen showing a drawing in progress wherein the PopSet™ option is enabled to illustrate various techniques for re-displaying a non-modal dialog box according to the invention.
Figure 5B:
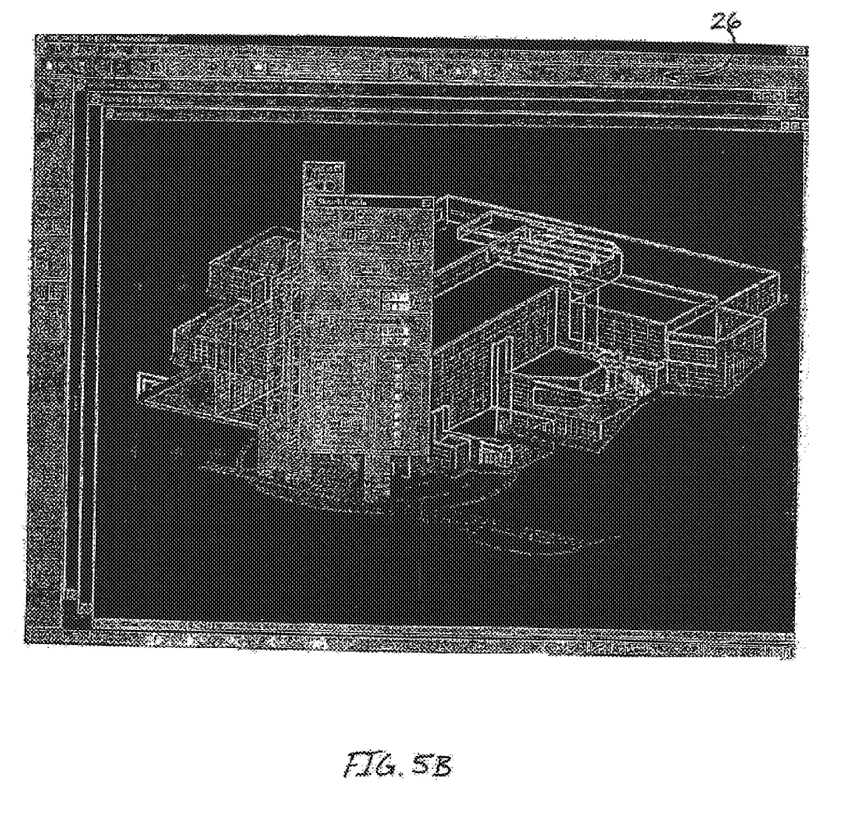
Figure 5C:
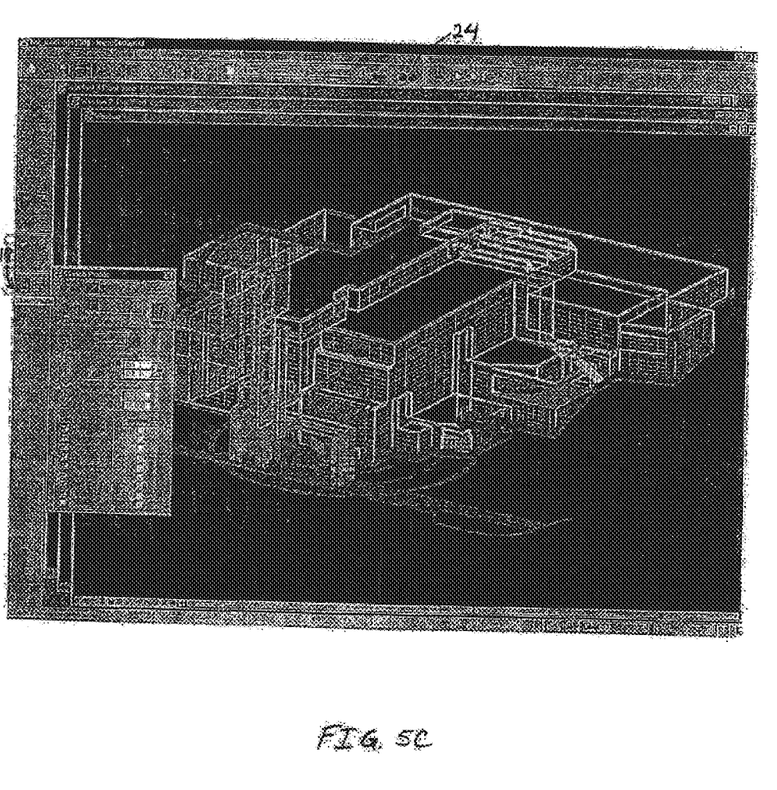
Figure 5D:
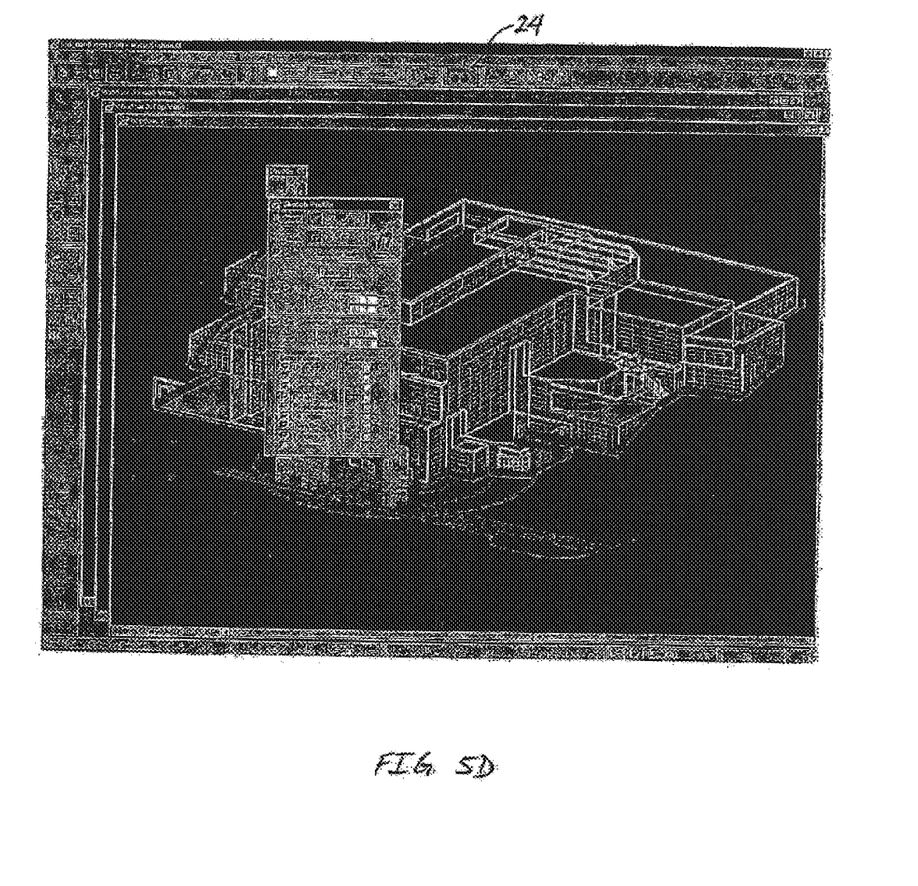

FIGS. 5A to 5D are screen shots of the building drawing of FIGS. 1 and 2A–2C wherein the PopSet™ option has been enabled, to illustrate various ways of re-displaying the Sketch Profile dialog box 17. In particular, in FIG. 5A the computer user has moved the cursor 18 over the PopSet™ option box 24. As shown, the Sketch Profile dialog box 17 has reappeared next to the PopSet™ tool icon 24. Similarly, in FIG. 5B the PopSet™ tool icon 24 has been moved by a user to a central point of the display screen away from the toolbar 26, and the cursor has subsequently been moved over the PopSet™ tool icon so the dialog box 17 reappears below it. In FIG. 5C, the cursor 18 has been moved over the sketch tool icon 19, and since the PopSet™ option has been enabled the dialog box 17 reappears next to the icon 19. Similarly, in the case where the sketch tool icon 19 has been moved to a central location away from its tool bar as shown in FIG. 5D, the cursor 18 has been moved over the sketch tool icon 19 and the dialog box 17 reappears below the icon 19. A user may also access a tool settings dialog box wherever the cursor is currently located on the screen by simultaneously pressing a keyboard key combination such as "control-space" (Cntrl-Space). When the user utilizes a key combination in this manner, the cursor is centered in the dialog box which minimizes repetitive motions of a user to facilitate work and improve productivity. The display box can then be dismissed using the same key combination.

Figure 6:
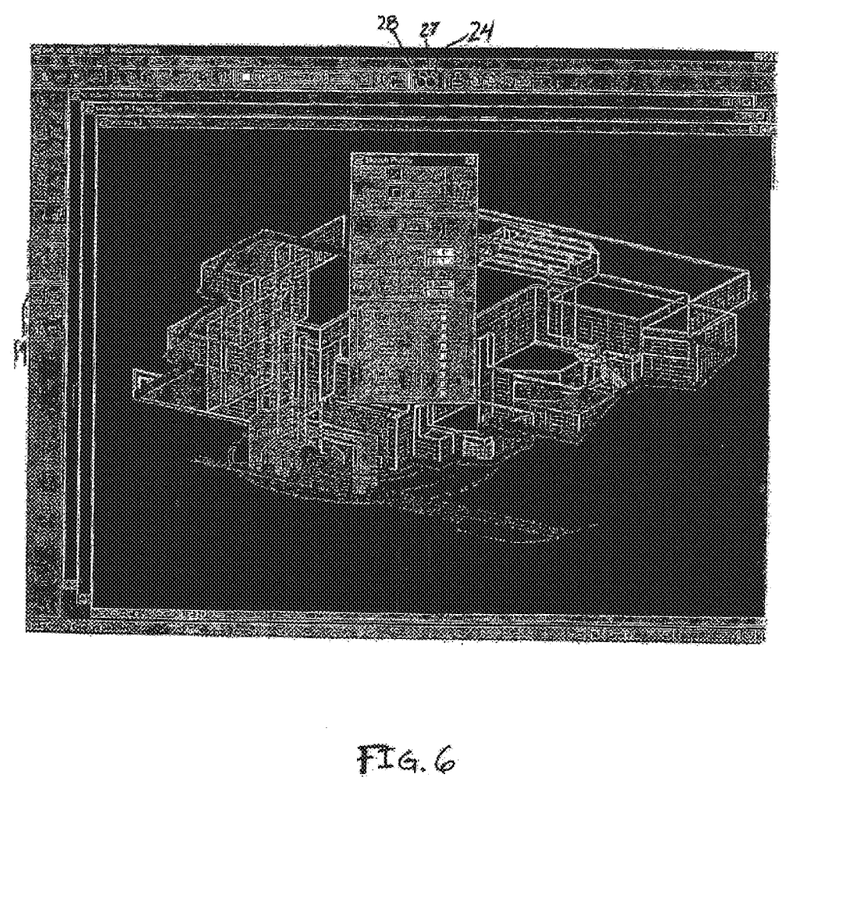
FIG. 6 is a snapshot view of a computer display screen showing a drawing in progress wherein the PopSet™ option is disabled.

The functionality of the PopSet™ option can be suspended by disabling it as shown in FIG. 6. In this case, since the sketch tool 19 had already been chosen, when the user clicks on the button 28 of the PopSet™ icon 24 to disable it, the dialog box 17 reappears in the center of the display screen and the bright red light is displayed. If the draftsperson now wishes to access the screen real estate behind the dialog box 17, she must dismiss the dialog box, or drag it to another part of the screen, or enable the PopSet™ option so that it will be hidden from view until recalled.

The invention, as shown in the PopSet™ application example set forth above, affords a user a technique for maximizing the amount of computer screen real-estate space usable for displaying work while also preserving a full range of options for conducting operations. Further, the capability of temporarily hiding or sinking the non-modal dialog box also minimizes the need for a user to utilize the mouse or other cursor manipulator device. This reduction in the use of the mouse is beneficial because it minimizes repetitive movements which may put stress on a users wrist, and permits more time to be devoted to actually working on the project rather than to calling up, moving and/or dismissing dialog boxes.

A number of embodiments of the invention have been described. Nevertheless, it will be understood that various modifications may be made without departing from the spirit and scope of the invention. Accordingly, other embodiments are within the scope of the following claims.

What is claimed is:

1. A method for automatically dismissing option information comprising:

displaying a workspace on a computer screen;

displaying at least one icon;

presenting a non-modal dialog box within the workspace when a predetermined icon is chosen;

providing a preference option that, when enabled by a user, operates to hide the non-modal dialog box when a cursor moves off a frame of the dialog box to maximize the amount of available workspace on the computer screen for displaying work; and providing a hot-spot for restoring the non-modal dialog box when the cursor moves over the hot-spot, wherein the hot-spot is re-locatable by a user to any location on the workspace.

2. The method of claim 1, wherein the hot-spot includes at least one of the icon and a preference option box.

3. The method of claim 1, further comprising providing a means to activate and to deactivate the preference option.

4. The method of claim 1, further comprising providing a means for customizing the preference option.

5. The method of claim 4, wherein the means for customizing is a preference option properties dialog that includes at least one customizable feature choice.

6. The method of claim 5, wherein the customizable feature includes at least one of a choice between a large and a small preference option icon, an automatic positioning option for tool settings dialog boxes, a new tool delay time, and a hide dialog delay time.

7. A computer program residing on a computer-readable medium that provides a method for automatically dismissing option information, the program comprising instructions for causing a computer to:

display a workspace on a computer screen, the workspace having at least one toolbar including a plurality of icons that each represents a tool;

display a non-modal dialog box within the workspace when an icon is chosen;

hide the non-modal dialog box when a preferences option is enabled and a cursor is moved outside the boundaries of the non-modal dialog box to maximize the amount of available workspace on the computer screen for displaying work; and restore the non-modal dialog box when the cursor moves over a predetermined hot-spot on the workspace, wherein the hot-spot is re-locatable by a user to any location on the workspace.

8. The program of claim 7 further including instructions to permit a user to disable and enable the preference option.

9. The program of claim 7 wherein the hot-spot includes at least one of a tool icon and a preference option icon.

10. The program of claim 7, further comprising instructions enabling a user to customize the preference option.

11. The program of claim 10, wherein a preference option properties dialog box including at least one customizable feature is provided.

12. The program of claim 11, wherein the customizable features include at least one of a choice of a large or small preference option box, a choice of automatically positioning a tool settings dialog, a new tool delay time, and a hide dialog delay time.

* * * * *